United States Patent [19]
McCrea

[11] 3,984,099
[45] Oct. 5, 1976

[54] DOCUMENT FEEDING SYSTEM
[75] Inventor: James E. McCrea, Fairport, N.Y.
[73] Assignee: Xerox Corporation, Stamford, Conn.
[22] Filed: Oct. 28, 1975
[21] Appl. No.: 626,438

[52] U.S. Cl. .............................................. 271/276
[51] Int. Cl.² ........................................... B65H 5/02
[58] Field of Search ............ 271/276, 197, 164, 94, 271/30 R

[56] References Cited
UNITED STATES PATENTS

| | | | |
|---|---|---|---|
| 3,202,302 | 8/1965 | Insolio | 271/197 X |
| 3,309,078 | 3/1967 | Nash | 271/276 X |
| 3,330,555 | 7/1967 | Shearer | 271/30 R |

*Primary Examiner*—Richard A. Schacher
*Attorney, Agent, or Firm*—Earl T. Reichert

[57] ABSTRACT

An improved document feeding system includes a flat perforated vacuum transport belt mounted to move one surface thereof across a scanning station, and a perforated document support plate for accurately placing a document on the belt. The plate is supported in a drawer, and the corner of the drawer and registration fingers serve to position the document on the support plate. After a document is positioned on the support plate, the drawer is slid to a position opposite the one surface of the belt, and then the support plate with the document thereon is moved to a position immediately adjacent that surface to position the document on the belt where the document is held via vacuum. The plate is then retracted into the drawer, and the belt with the document thereon is moved across the scanning station.

6 Claims, 1 Drawing Figure

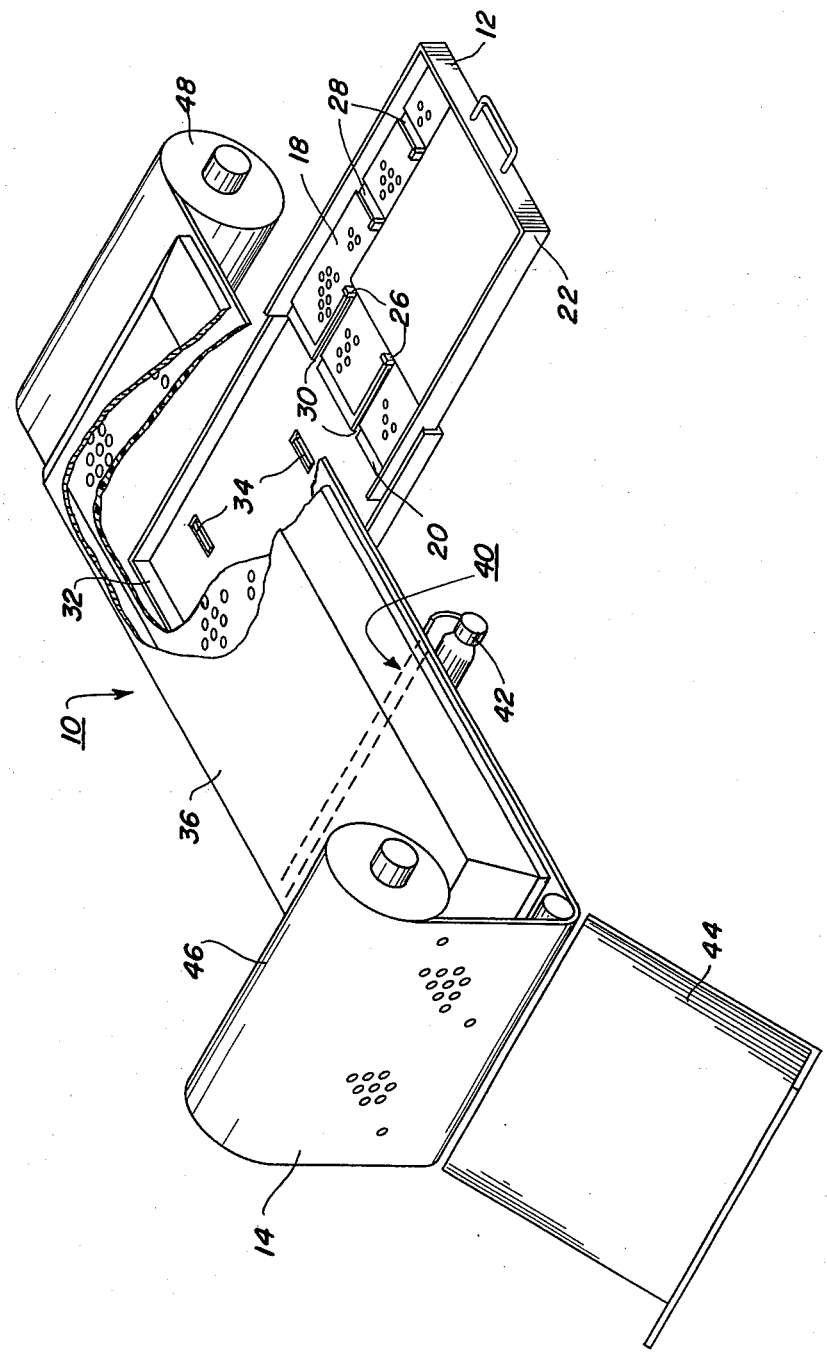

DOCUMENT FEEDING SYSTEM

BACKGROUND OF THE INVENTION

This invention relates to an improved document feeding system for an electrostatic reproduction machine, but more particularly to apparatus including a conveyor or transport belt for moving a document across a scanning station and means for easily and very accurately positioning any one of a plurality of documents of various sizes directly on the belt so that the document is properly located with respect to the scanning station as the document is moved over the latter.

In a conventional electrostatic reproduction machine a xerographic plate (photoreceptor) comprising a layer of photosensitive insulating material affixed to a conductive backing is used to support electrostatic latent images, the plate being in the form of a drum or an endless belt, for example. In the xerographic process, the photosensitive surface is electrostatically charged, and the charged surface is then exposed to a light pattern of the image being reproduced to thereby discharge the surface in the areas wherein light strikes the surface. The undischarged areas of the surface thus form an electrostatic charge pattern (an electrostatic latent image) conforming to the original pattern. The latent image is then developed by contacting it with a finely divided electrostatically attractable powder referred to as "toner". Toner is held on the image areas by the electrostatic charge on the surface. Where the charge is greater, a greater amount of toner is deposited. Thus, a toner image is produced in conformity with a light image of the copy being reproduced. Generally, the developed image is then transferred to a suitable transfer member (e.g., paper), and the image is affixed thereto (e.g., by heat fusing) to form a permanent record of the original document.

In the practice of xerography, the transfer member is caused to move in synchronized contact with the photosensitive surface during the transfer operation, and an electrical potential opposite from the polarity of the toner is applied to the side of the paper remote from the photosensitive surface to electrostatically attract the toner image from the surface to the paper.

In modern electrostatic reproduction machines, it is often necessary to move documents across a scanning station in order to produce the latent image on the photosensitive surface. In one prior art arrangement of a document feeding system, only documents of a certain width can be handled without the use of a special carrier to place the document in as it moves through the machine. In addition, this arrangement uses grippers to grip the lead edge of the document as it moves through the machine, and the grippers "print-out" onto the copy made. Also, the grippers tend to tear or deface the document if the latter is very thin. In other prior art arrangements, if the operator does not release the document at the proper time, the document may be improperly positioned as it moves through the machine and across the scanning station. In some instances it is difficult for the operator to properly register the document because the document registration mechanism is out of the sight of the operator. Thus, what is needed is a document feeding system which overcomes the problems of these prior art arrangements.

SUMMARY OF THE INVENTION

The present invention is directed to an improved document feeding system for feeding documents which are to be copied or reproduced through an electrostatic reproduction machine. The system includes a perforated conveyor belt which is mounted to move a first side thereof across a scanning station of an electrostatic reproduction machine. A perforated document support member is mounted so that it can be moved to a first position in sight of an operator where he can easily register a document thereon, then to a second position where the member is stopped opposite and parallel to the first side of the belt, and then toward the belt to a third position immediately adjacent the first side of the belt. In this latter position, the document on the support member is attracted to and held on the belt via a vacuum created by a vacuum unit located immediately adjacent the opposite side of the belt. After the document has thus been located on the belt, the latter, along with the document thereon, is moved across the scanning station, after which the document is dropped into a collection tray.

BRIEF DESCRIPTION OF THE DRAWINGS

The FIGURE is a perspective view of the preferred embodiment of the invention, an improved document feeding system.

DETAILED DESCRIPTION OF THE INVENTION

Referring to FIG. 1, the operation of the document feeding system 10 will be described. The operator slides a drawer 12 out from beneath the perforated belt 14 to the position shown. In this position, a document 16 is placed onto a perforated support member 18, the latter being supported by the bottom 20 of the drawer. The document is moved into the corner 22, and registration fingers 24 and 26 are moved along slots 28 and 30 against the sides of the document. The registration fingers are slidably mounted in the bottom 20 of the drawer by any suitable means such as horizontal tabs positioned in a recess formed in the bottom.

The operator then pushes the drawer 12 from this first position inwardly beneath the belt until the drawer is stopped by member 32 at a predetermined second position spaced from, opposite, and parallel to the bottom side of the belt 14. After the support member 18 reaches this second position, cams 34 move upwardly through an opening in the bottom 20 of the drawer and move the support member 18 toward the bottom side of the belt 14 to a predetermined third position immediately adjacent thereto. The cams 34 may be either moved manually by the operator, or automatically moved by a solenoid which is actuated when the drawer contacts the member 32.

Upon reaching this third position, the document is attracted to and held on the belt 14 via a vacuum unit 36 positioned over and immediately adjacent the upper side of the belt 14. The cams 34 then lower the support member 18 back into the drawer. The operator then causes the belt 14 to move in the direction of the arrow, thus passing the document 16 over a fixed scan station 38, the latter including scan area 40 and a fixed lamp 42. After passing the scanning station 38, the document drops into a collection tray 44, after which the operator stops the movement of the belt 14.

As shown in FIG. 1, the ends of the belt 14 are connected to rollers 46 and 48. Documents can be moved over the scanning station 38 until the belt is completely unwound from the roller 48. At that point, the belt must be moved in the opposite direction until the belt is completely unwound from the roller 46, after which documents can once again be fed to the scanning station. It should be realized that the means for moving the belt over the scanning station may take many forms, only one of which is shown. Another possible arrangement, for example, is to use an endless conveyor belt mounted on two or more rollers.

While the invention has been described with reference to the structure disclosed, it is not confined to the details set forth, but is intended to cover such modifications or changes as may come within the scope of the following claims.

What is claimed is:

1. An improved document feeding system for moving a document across a scanning station of an electrostatic reproduction machine, the improvement comprising:
    a perforated transport belt having a first side and an opposite second side, the belt being mounted for movement of the first side thereof across and adjacent the scanning station, a vacuum unit positioned immediately adjacent the second side of the belt for producing a vacuum at the first side via the perforations, a planar document support member, means for supporting the support member and for moving the latter between a first position in which the support member is located in view of an operator so that a document can be placed thereon, a second position in which the support member is located opposite, parallel to, and spaced from the first side of the belt, and a third position in which the support member is located parallel to and immediately adjacent the first side of the belt.

2. An improved document feeding system according to claim 1, wherein the document support member is a perforated plate, and the supporting and moving means includes a drawer slidably mounted to move in a direction at least generally parallel to the first side of the belt and means for moving the perforated plate in a direction generally perpendicular to the first surface of the belt to the third position after the plate is located in the second position.

3. An improved document feeding system according to claim 2, and further including means for stopping the drawer in the second position when the drawer is moved from the first position toward the second position.

4. An improved document feeding system according to claim 1, and further including means for locating the document in a predetermined location on the support member while the latter is in the first position.

5. An improved document feeding system according to claim 3, and further including means for locating the document in a predetermined location on the support member while the latter is in the first position.

6. An improved document feeding system for moving a document across a scanning station of an electrostatic reproduction machine, the improvement comprising:
    a flat perforated transport belt mounted for movement of one side thereof across the scanning station, a vacuum unit located immediately adjacent the opposite side of the belt for producing a vacuum at the one side via the perforations, a perforated planar document support member, means for locating the document in a predetermined position on the support member while the latter is in a loading position in view of an operator, and means for moving the support member with the document thereon from the loading position to a position parallel to and immediately adjacent the one side of the belt whereby the document is positioned and held on the belt via the vacuum.

* * * * *